Sept. 30, 1930.   R. C. BURT   1,776,993
PHOTO ELECTRIC CELL AND PROCESS OF PRODUCING THE SAME
Filed May 26, 1926
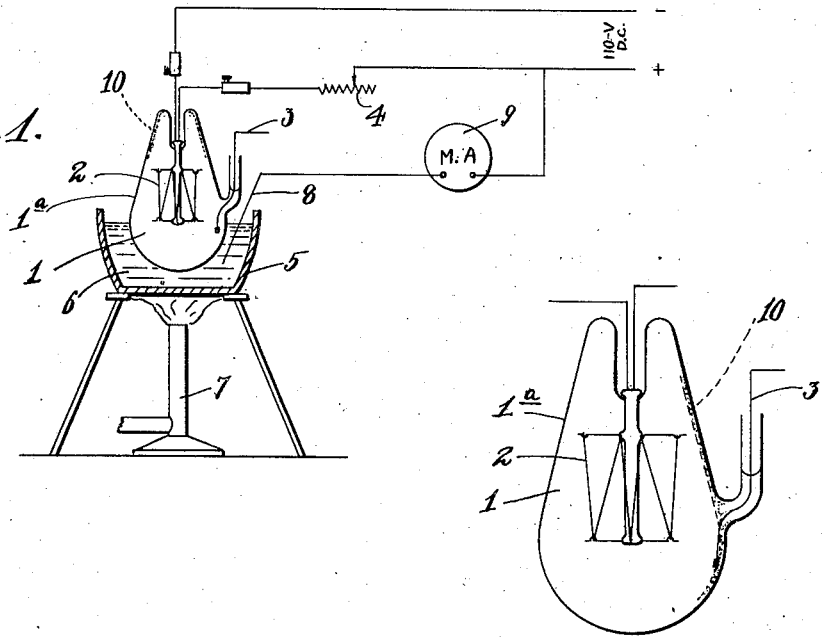
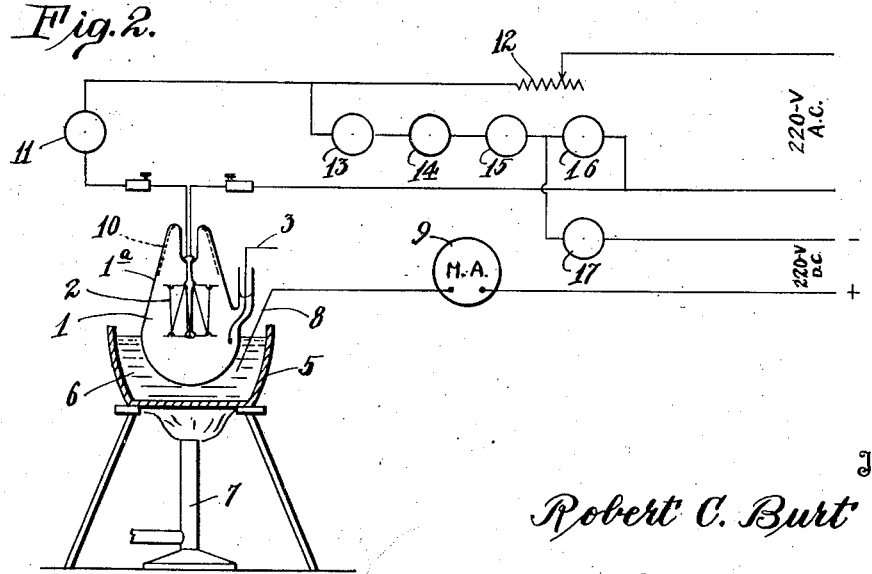
Inventor
Robert C. Burt
By Lyon & Lyon
Attorneys Patented Sept. 30, 1930

1,776,993

UNITED STATES PATENT OFFICE

ROBERT C. BURT, OF PASADENA, CALIFORNIA, ASSIGNOR TO CALIFORNIA INSTITUTE OF TECHNOLOGY

PHOTO-ELECTRIC CELL AND PROCESS OF PRODUCING THE SAME

Application filed May 26, 1926. Serial No. 111,869.

Heretofore, when producing photo-electric cells such, for example, as are employed in picture telegraphic apparatuses, the metal for the cathode of the cell has been introduced into the transparent container (commonly glass) by distilling the metal from an auxiliary chamber into the transparent container. In such process, the metal is first placed in bulk in the auxiliary chamber. The metals which are most photo sensitive and, therefore, most highly desirable in a photo-electric cell are very easily oxidized in air. The most desirable metals for this purpose are the alkali metals, particularly, sodium, potassium and lithium. The oxides of these metals are insensitive and accordingly, the prior processes for producing photo-electric cells which involve a distillation method, due to the accompanying oxidation of the alkali metals, have produced photo-electric cells in which the metal is partially oxidized and therefore not of the greatest efficiency.

It is an object of the present invention to provide a photo-electric cell and process of producing the same which will overcome the difficulties of the prior cells and processes and particularly will provide a cathode for the photo-electric cells formed of alkali metal, such as sodium, potassium or lithium, which is substantially free of oxides and, therefore, is extremely sensitive and superior in operation to the photo-electric cells now employed.

In accordance with the present invention, the alkali metal to form the cathode in the photo cell, is caused to diffuse through the transparent container of the photo-electric cell. In order to accomplish such a diffusion of the metal into the cell, the transparent container of the photo-electric cell is made of glass which contains mobile ions of the metal which it is desired for the cathode of the photo-electric cell. A container formed of such glass is then placed into a salt of the same metal and subjected to an electrolytic action by which the salt of the metal will yield a metal to the glass which is under the process transported into the interior side of the transparent container, where it appears as the pure metal adapted to act as a cathode of a photo-electric cell, the metal being in a state of exceptional purity free from oxide and possessing extremely high sensitiveness.

The invention, with further objects and advantages of the same, will best be understood from a description of a preferred form or forms of photo-electric cells embodying the present invention and of the preferred form or forms of methods and processes of producing the same.

In order to illustrate the invention, reference is made to the accompanying drawings, in which:

Figure 1 is a diagrammatic view of an apparatus for carrying out the process of producing a photo-electric cell, Figure 2 is a diagrammatic view of a modified form of apparatus for producing a photo-electric cell, and, Figure 3 is a section of the finished photo-electric cell.

Referring first to Figure 1, the simplest form of the invention is therein illustrated, in which a common incandescent lamp 1 is shown having the usual filament 2 from which the base has been removed by heat. This incandescent lamp may, for example, be of common 40 or 60 watt metal filament lamp, formed of soda glass in which the sodium ion is mobile. The analysis of a standard lime bulb glass found to be very satisfactory is:

|  | Per cent |
|---|---|
| $SiO_2$ | 72.75 |
| $NaO_2$ | 17.28 |
| $CaO$ | 5.28 |
| $MgO$ | 3.40 |
| $Al_2O_3$ | 1.11 |
| $Fe_2O_3$ | 0.18 |

As illustrated at 3, there is first sealed into the lamp a lead wire which will be adapted to establish contact with the metal diffused into the lamp in order to form the cathode.

The filament 2 is indicated as lighted from a 110 volt source through a resistance 4. The bulb of the filament is partially immersed in a bath of molten sodium salt, such as sodium nitrate, 5 indicating a crucible containing the sodium nitrate 6. The crucible is heated to melt the salt by suitable means, such as a Bunsen burner 7.

An electrode 8 is positioned within the molten salt for which purpose a heavy copper wire is satisfactory. This electrode is connected to the positive wire of the 110 volt source through a milliameter 9.

The resistance 4 is then reduced until the filament 2 of the bulb begins to emit electrons. These electrons will be carried to the glass wall opposite the molten salt by the field. These electrons neutralize sodium ions in the glass which thus become atoms. These atoms of sodium are then evaporated by the heat at the bottom of the bulb and condense at the top of the bulb, as indicated at 10, where the glass is cooler. Sodium ions from the molten salt replace those of the glass and migrate through it, being in turn neutralized at the inner surface. In this manner, the sodium from the molten salt in the crucible 5 is driven electrically through the glass wall 1ª of the bulb. Gases from the decomposition of the nitrate ion will be observed arising from the electrode 8.

Any source of sodium, of course, may be employed to replace the molten nitrate. For example, ½ per cent. sodium amalgam may be employed. It is also understood that in place of direct current, alternating current may be employed in the process inasmuch as the filament 2 itself acts as a rectifier. After sufficient of the metallic sodium has been driven through the glass wall to provide the proper cathode, the glass bulb is removed from the bath and disconnected. Subsequently, by heating the bulb, the metallic sodium therein can be caused to melt and pass to the one side surface, as shown in Figure 3, where it makes electrical contact with the lead 3, for use as a photo-electric cell.

The apparatus shown in Figure 1 is the simplest for performing the process of the present invention but has some objectionable features which may be eliminated through the process as carried out with the apparatus of Figure 2. For example, with the apparatus of Figure 1, one end of the filament 2 carries more current than the other and, therefore, becomes overheated, especially if the electrolytic current is permitted to exceed or become as large as 0.1 ampere. Moreover, if the entire bulb is permitted to become too hot and thus increase the pressure of sodium vapor therein, ionization will take place between the filament leads, burning them out and spoling the cell. Accordingly, I prefer to employ the process as shown in Figure 2. In Figure 2, the incandescent bulb 1 with filament 2 and special lead 3 for the cathode is the same as in the previous embodiment of the invention. This bulb is likewise immersed in a sodium salt 6 in the crucible 5, heated by a burner 7, as in the previous form of the invention. The filament of the bulb is connected in series with a similar light bulb 11 and both filaments are lighted by a 220 volt alternating means, the current passing through a resistance 12. By reducing resistance 12, the filament 2 is heated and is caused to emit electrons as in the previous case, and these electrons are carried to the glass wall by the direct (220 volt) field as before. The resistance of the incandescent bulb 11 now prevents too large a current through the filament 2 of the bulb 1, thereby preventing overheating of the bulb, ionization and burning out of the filament leads. Four light bulbs 13, 14, 15 and 16 are connected in series across the terminals of the bulbs 1 and 11. The connection between the bulbs 15 and 16 then operates at the potential of the middle of the filament 2 in the bulb 1, this being a simple potentiometer connection. By applying a source of direct current to this point, local heating of the filament is greatly reduced. Electrolysis current now flows equally through each filament lead. Therefore, the negative of the direct current mains, which are indicated as 220 volts, is connected to this point through a bulb 17. This bulb 17 acts as a stabilizing resistance to prevent destructive ionization current between the filament and glass wall. There is also provided the milliameter 9 in the positive direct current lead to the electrode 8 in the molten salt 6.

By the use of the apparatus as connected in Figure 2, currents as large as 0.3 amperes may be used and this results in a deposition of exactly 257.4 milligrams of sodium in an hour according to Faraday's laws, using a 60 watt, 110 volt lamp for the bulb 1. The sodium diffused and forced into the bulb, on test, apparently possesses a purity greater than one part in 500,000. This sodium, as in the previous case, collects during the process in the upper end of the bulb 1, as indicated at 10, and may be connected with the lead 3 by heating the bulb at the end of the process, in order to melt the same.

This electrolysis through glass has, by careful experiment, been found to obey Faraday's electrolysis laws very accurately, probably to one part in six thousand or better. Furthermore, due to the ease of cleaning glass, it is a very accurate and convenient form of coulombmeter or voltameter, inasmuch as its accuracy is unaffected by ordinary impurities in the molten electrolyte.

The process may also be employed with success for the diffusion of other alkali metals into glass. It is found generally that it is necessary in such a process to have the glass of the bulb contain a mobile ion of the metal which it is desired to diffuse into the bulb. Thus, if it is desired to form a photoelectric cell of potassium metal as the cathode, it would be necessary to employ a bulb formed of potash glass having a mobile potassium ion.

Hydrogen or other gases may be admitted into the bulb for producing special surfaces as sodium hydrite, or to increase the current by ionization.

While I have herein described the invention in a practical form, it is understood that various modifications and changes may be made without departing from the principles of the invention and the invention includes all such modifications and changes and substitution of equivalents as come within the scope of the appended claims.

I claim:

1. A process of making photo-electric cells which comprises immersing a glass bulb having a filament in a molten alkali salt, establishing an electrical field between the salt and the filament of the bulb, thereby causing alkali metal from the salt to migrate through the glass where it is available as a cathode of the cell.

2. A process of making photo-electric cells which includes positioning a filament and a cathode lead in a glass housing, immersing the housing in a molten alkali salt, establishing an electrical field between the salt and filament, thereby causing alkali metal from the salt to migrate through the glass where it is available as a cathode of the cell, the glass housing being free of materials adapted to combine with the cathode material.

3. A process of making photo-electric cells which includes positioning a filament and a cathode lead in a glass housing, placing the housing in contact with a molten salt, establishing an electrical field between the salt and filament, thereby causing metal from the salt to migrate through the glass where it is available as a cathode of the cell, the glass housing being free of all materials that decreases the sensitivity of pure metal.

Signed at Pasadena, California, this 18th day of May 1926.

ROBERT C. BURT.